March 13, 1928.

G. LOMBARDI 1,662,505

VARIABLE CONDENSER

Filed Dec. 10, 1924

Inventor

Giovanni Lombardi

By Wooster & Davis

Attorneys

Patented Mar. 13, 1928.

1,662,505

UNITED STATES PATENT OFFICE.

GIOVANNI LOMBARDI, OF DERBY, CONNECTICUT.

VARIABLE CONDENSER.

Application filed December 10, 1924. Serial No. 754,968.

This invention relates to variable condensers, and has for an object to provide a plurality of means for adjusting the movable plates, one of which may be used for a rapid or rough adjustment and the other to give a fine or micrometer adjustment.

It is also an object of the invention to provide an improved mounting for the plates to always maintain them in proper alignment.

Figure 1:
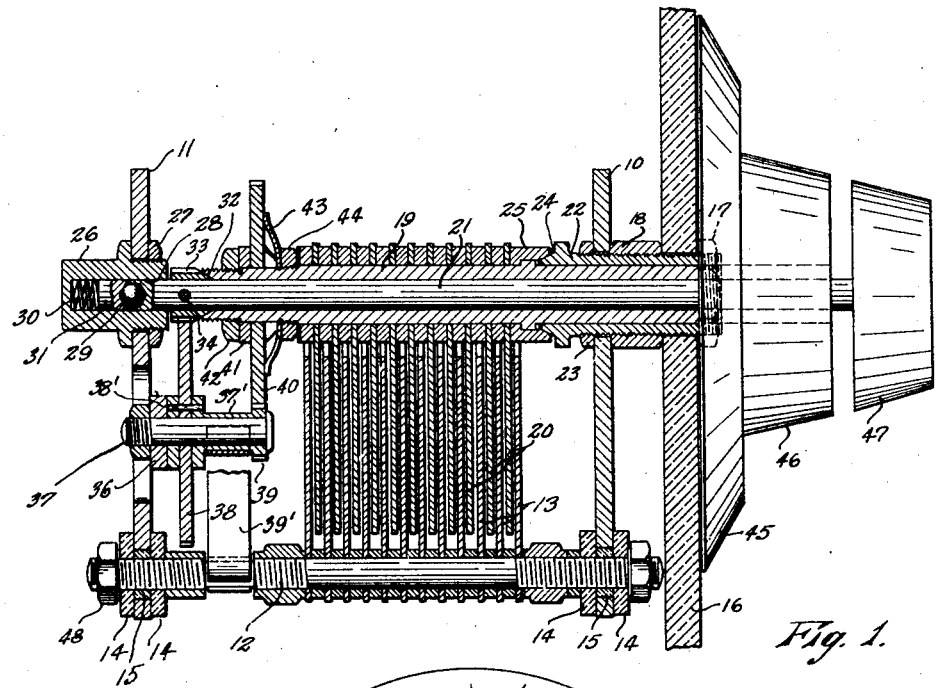
Figure 2:
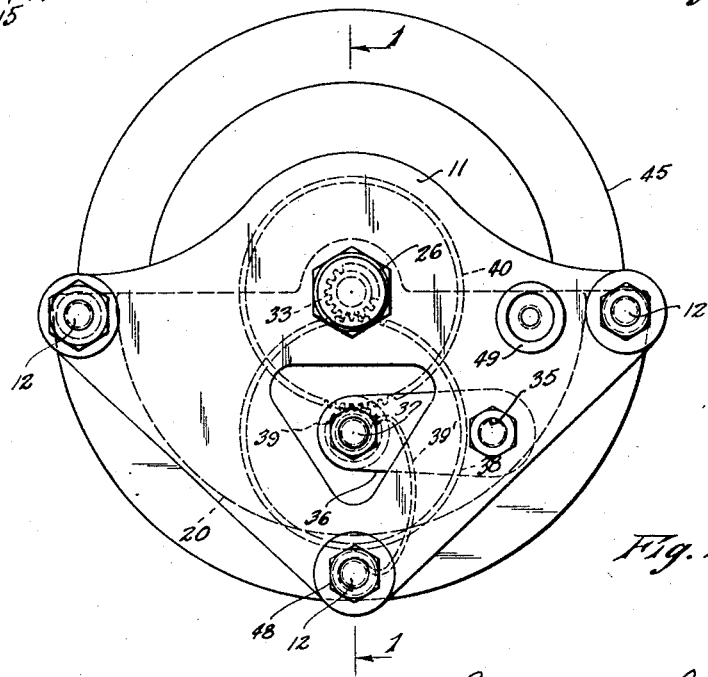

With the foregoing and other objects in view, I have devised the construction illustrated in the accompanying drawing forming a part of this specification, similar reference characters being employed throughout the various figures to indicate corresponding elements. In this drawing, Fig. 1 is a longitudinal section through a variable condenser showing one embodiment of my invention, the dial and operating knobs being shown in elevation, and the section being taken substantially on line 1—1 of Fig. 2, and Fig. 2 is a rear end elevation of the device.

As is usual in condensers of this type, it comprises a frame consisting of outer and inner web plates 10 and 11 respectively connected by rods or posts 12 which carry the stationary condenser plates 13 in proper spaced relation. In the present construction the rods or posts 12 are insulated from the plates 10 and 11 by insulating washers 14 and bushings 15. The condenser may be secured to the rear of a panel board 16 by any suitable means, such as a nut 17 threaded on a tubular sleeve 22 secured to the outer plate 10 by clamping the plate between a collar 18 and a nut 23 threaded on the sleeve 22. The collar 18 also engages the rear of panel 16 so that the panel is clamped between the collar and the nut 17.

Mounted between the web plates 10 and 11 is a rotary shaft 19 carrying the movable condenser plates 20 in suitable spaced relation, and interleaved with but spaced from the stationary plates 13. I have provided a plurality of means for rotating this shaft to vary the position of the movable plates with respect to the stationary plates to vary the capacity of the condenser. In the present construction the shaft 19 is a tubular shaft and a second shaft 21 extends through this tubular shaft. Extending through the outer plate 10 is the sleeve 22 which is secured to the plate as above described by a suitable nut 23 and collar 18 threaded on the sleeve and clamped against the opposite sides of the plate 10 to secure the sleeve in position. This sleeve forms a bearing for the outer shaft 19 and it also has a tapered bearing 24 at its inner end coacting with a similarly tapered bearing carried by a collar 25 secured to the shaft 19. The shaft 19 is free to rotate on shaft 21. This inner shaft at its inner end projects into a bearing block 26 secured to the inner plate 11 as by means of a nut 27 threaded to the block and clamping it to the plate. This block has a socket 28 into which the end of the shaft 21 projects, and a thrust bearing including a ball 29 is mounted in the socket and is held against the end of the shaft by a spring 30. If preferred a plunger 31 may be inserted between the spring and the ball to give a better bearing for the ball, and the end of the shaft is preferably provided with a socket in which the ball is seated. The inner end of the outer shaft 19 is provided with a tapered bearing 32 fitting a similarly tapered bearing on a pinion 33 secured to the inner shaft 21 as by a pin 34. It will thus be apparent that the spring 30 acting through the inner shaft and the bearing 32 will tend to hold the shaft 19 against the tapered bearing 24. Thus as the bearing 24 wears the wear will be automatically taken up by the action of the spring, and as the bearing is tapered the shaft will always be maintained in proper alignment, and therefore, cannot tip to allow the movable condenser plates 20 to either get out of parallelism with the stationary plates 17 or come in contact therewith. The lateral movement of the plates caused by longitudinal movement of the shaft as the tapered bearing wears may be compensated for by adjusting the sleeve 22 in plate 10. The ball thrust bearing at the inner end of the inner shaft gives very little resistance and allows easy manipulation of the shaft.

Pivoted to the inner web plate 11 at 35 is a link or arm 36 which carries a pin or stud 37. Mounted to rotate on this pin or stud is a sleeve 37′ carrying a gear 38 secured thereto by any suitable means as a pin 38′. Also carried by the sleeve 37′ is a pinion 39 meshing with a gear 40 on the outer shaft 19. A spring 39′ is carried by the lower rod or post 12 and engages the sleeve 37′ at its upper end. This spring tends to turn the member 36 clockwise about its pivot 35 as viewed in Fig. 2 and retain the two sets of gears 33—38 and 39—40 tightly in mesh and eliminates any backlash due to wear or incorrect meshing of the gears. The shaft 19 may rotate relative to the gear 40, but the gear is, however, connected to the shaft in such a way that it may under certain conditions act as a driving means for the shaft. In the present construction this arrangement is secured by mounting on the shaft an abutment, as a washer 41, held in position by a nut 42 threaded on the shaft, which washer engages one side of the gear 40, and on the opposite side a curved spring plate or washer 43 engages the gear and is held in position by a nut 44 threaded on the shaft. Thus there is provided a frictional drive between the gear 40, and the shaft, which drive under certain conditions will allow the shaft to rotate independently of the gear.

At the front or outer side of the panel 16 a dial 45 having a thumb knob 46 is rigidly secured to the outer shaft 19 and the surface of the knob is preferably knurled to facilitate its operation. The end of the inner shaft 21 extends through the dial and knob 46, and rigidly secured to its outer end is a second knob 47 which is independent of the first knob and is used to operate the inner shaft. In the construction illustrated one lead wire may be connected to the stationary plates by binding post 48 and the other lead wire to the movable plates by binding post 49.

In operation the rough or quick adjustments of the movable plates 20 may be secured by rotating the knob 46 which will rotate the outer shaft 19 carrying the movable plates. In this operation the gear train 40, 39, 38, and 33 does not interfere with the operation of this shaft because the frictional connection, including the spring plate 43, between the gear 40 and the shaft will slip and will allow the shaft to rotate independently of the gear 40. This spring will also serve to maintain the shaft and the plates secured thereby in the adjusted positions. After this rough adjustment has been secured the fine or micrometer adjustment may be secured by rotating the knob 47. Rotation of this knob will rotate the inner shaft 21 and the pinion 33 which will rotate gear 38, sleeve 37′, pinion 39 and gear 40, which gear, through its frictional connection with the shaft 19, will rotate this shaft to further adjust the movable plates 20. As this gear train, however, is a reducing drive a relatively large turning movement of the knob 47 will be required to give a relatively small movement of the outer shaft 19 and the plates carried thereby so that a very fine adjustment may be secured.

It is to be noted that with this construction I am enabled to use a plurality of adjusting means for the movable condenser plates, and that different amounts of movements of the operating knobs will give different amounts of adjustments to the plates. With the slip drive as described no manipulation is required of a clutch or other connecting and disconnecting means in changing from one adjusting means to the other. In other words, all the operator has to do in making the adjustment is to grip either the knob 46 or 47 and rotate it until he gets the adjustment desired. By placing the gear drive as illustrated it does not in any way interfere with the dial and so does not limit the size of the dial in any way, and furthermore, the dial is located central with respect to the operating shafts. Also by placing these gears on the inside of the plate 11 I am enabled to use the ball thrust bearing for the shaft 21 as described above. Furthermore, the means of mounting the movable plates keeps them in proper position, and what adjustment is required because of wear is a very simple one.

Having thus set forth the nature of my invention, what I claim is:

1. In a device of the character described, a pair of concentric shafts, independent means for operating said shafts, spaced supports, cooperating tapered thrust bearings carried by the outer shaft and one of said supports, means carried by the other support having a chamber receiving the end of the inner shaft, and a reducing driving connection between the shafts.

2. In a device of the character described, a pair of concentric shafts, independent means for operating the shafts, a pair of spaced supports cooperating tapered thrust bearings carried by the outer shaft and one of the supports, means carried by the other support having a chamber into which the end of the inner shaft projects, a ball thrust bearing in said chamber, and a reducing driving connection between the shafts.

3. In a device of the character described, a pair of concentric shafts, independent means for operating the shafts, spaced supports, cooperating tapered thrust bearings carried by the outer shaft and one of said supports, means carried by the other support having a chamber into which the end of the inner shaft projects, a ball thrust bearing in said chamber, a spring in the chamber tending to force the ball against the end of the shaft, and a reducing driving connection between the shafts.

4. In a device of the character described, concentric shafts, independent means for operating the shafts, spaced supports, cooperating tapered thrust bearings carried by the outer shaft and one of the supports, cooperating tapered thrust bearings carried by the two shafts, a thrust bearing for the inner shaft carried by the other support, and a reducing driving connection between the two shafts.

5. In a device of the character described, concentric shafts, independent means for operating the shafts, spaced supports, co-operating tapered thrust bearings carried by the outer shaft and one of the supports, cooperating tapered thrust bearings carried by the two shafts, a yieldable thrust bearing for the inner shaft on the other support tending to press the cooperating tapered bearings together, and a reducing driving connection between the shafts.

6. In a device of the character described, a pair of concentric shafts, independent means for operating the shafts, a support, cooperating thrust bearings carried by the outer shaft and said support, cooperating thrust bearings carried by the shafts, resilient means tending to force said bearings together, and a reducing driving connection between the shafts.

7. In a device of the character described, a pair of concentric shafts, independent means for operating the shafts, a support, cooperating tapered thrust bearings carried by the outer shaft and said support, cooperating thrust bearings carried by the two shafts, a reducing driving connection between the shafts, and resilient means tending to press the cooperating tapered thrust bearings together.

8. In a device of the character described, a pair of concentric shafts, independent means for operating the shafts, a pair of spaced supports, cooperating tapered thrust bearings carried by the outer shaft and one of the supports, a thrust bearing for the inner shaft carried by the other support, resilient means tending to press said bearing against the shaft, and a reducing driving connection between the shafts.

9. In a device of the character described, a pair of concentric shafts, independent means for operating the shafts, spaced supports, cooperating tapered thrust bearings carried by the outer shaft and one of said supports, means carried by the other support having a chamber into which the end of the inner shaft projects, a thrust bearing in said chamber, resilient means in the chamber tending to force the bearing against the end of the shaft, and a reducing driving connection between the shafts.

10. In a device of the character described, a pair of concentric shafts, independent means for operating the shafts, a pair of spaced supports, cooperating thrust bearings on the supports and the respective shafts, a gear secured to the outer shaft between said supports by a frictional connection adapted to allow independent movement of the shaft, a pinion carried by the inner shaft, a movable support pivoted to one of the first mentioned supports to move toward and from said shafts, a connected gear and pinion carried by said movable support meshing with the first mentioned gear and pinion respectively, and a spring tending to swing the movable support about its pivot and retain the respective gears and pinions in mesh.

11. In a device of the character described, a pair of concentric shafts, independent means for operating the shafts, a pair of spaced supports, cooperating thrust bearings carried by the outer shaft and one of the supports, cooperating thrust bearings between the shafts, a thrust bearing for the inner shaft carried by the other support, a gear secured to the outer shaft between said supports by a frictional connection adapted to allow independent movement of the shaft, a pinion carried by the inner shaft, a support mounted between the first supports to move toward and from said shafts, a connected gear and pinion carried by said movable support meshing with the first mentioned gear and pinion respectively, and yieldable means tending to move the latter support toward the shafts to maintain the respective gears and pinions in mesh.

In testimony whereof I affix my signature.

GIOVANNI LOMBARDI.